United States Patent
Kwon

(10) Patent No.: US 7,175,702 B2
(45) Date of Patent: Feb. 13, 2007

(54) NATURALLY DECOMPOSING DISPOSABLE TABLEWARE AND MANUFACTURING THEREOF

(75) Inventor: Yong-Duk Kwon, Jinhae (KR)

(73) Assignee: Han Jung C.I.T. Co., Ltd., Busan (KR)

( * ) Notice: Subject to any disclaimer, the term of this patent is extended or adjusted under 35 U.S.C. 154(b) by 0 days.

(21) Appl. No.: 10/561,958

(22) PCT Filed: Jul. 22, 2004

(86) PCT No.: PCT/KR2004/001820

§ 371 (c)(1),
(2), (4) Date: Dec. 22, 2005

(87) PCT Pub. No.: WO2005/010099

PCT Pub. Date: Feb. 3, 2005

(65) Prior Publication Data

US 2006/0154007 A1    Jul. 13, 2006

(30) Foreign Application Priority Data

Jul. 25, 2003    (KR) .................. 10-2003-0051269

(51) Int. Cl.
C08L 97/02    (2006.01)
C08L 89/00    (2006.01)

(52) U.S. Cl. .................................................. 106/126.2
(58) Field of Classification Search .............. 106/126.2
See application file for complete search history.

(56) References Cited

U.S. PATENT DOCUMENTS

| | | | | | |
|---|---|---|---|---|---|
| 5,153,037 | A | * | 10/1992 | Altieri | .................. 428/35.6 |
| 5,160,368 | A | * | 11/1992 | Begovich | .................. 106/126.2 |
| 5,205,863 | A | * | 4/1993 | Elion | .................. 106/126.3 |
| 5,317,037 | A | * | 5/1994 | Golden et al. | .............. 523/128 |
| 5,360,586 | A | * | 11/1994 | Wyatt et al. | .................. 264/54 |
| 5,852,078 | A | | 12/1998 | Willett et al. | |
| 5,976,235 | A | * | 11/1999 | Andersen et al. | ....... 106/162.51 |
| 6,176,915 | B1 | * | 1/2001 | Franke et al. | ............. 106/125.1 |
| 6,805,823 | B2 | * | 10/2004 | Franke et al. | ................ 264/151 |
| 6,878,199 | B2 | * | 4/2005 | Bowden et al. | .......... 106/162.5 |
| 2003/0047110 | A1 | * | 3/2003 | Poovarodom et al. | ... 106/124.4 |
| 2005/0029703 | A1 | * | 2/2005 | Franke et al. | ................ 264/151 |

FOREIGN PATENT DOCUMENTS

EP          001120042 A2 *  8/2001

* cited by examiner

Primary Examiner—David M. Brunsman
(74) Attorney, Agent, or Firm—Arent Fox PLLC

(57) ABSTRACT

Disclosed is disposable tableware which is completely degradable under environmental conditions without environmental contamination. The disposable tableware is prepared using environmentally friendly, completely degradable materials without additional chemical additives while maintaining the shape and function of general disposable tableware so that it is completely degraded under environmental conditions, thus not causing environmental contamination and problems associated with waste disposal such as separation from other wastes. Also, the present invention discloses a method of manufacturing such disposable tableware. The disposable tableware is prepared by compression-molding a composition including 1–30 wt % of crop residues, 1–30 wt % of corn flour, 1–10 wt % of paper mulberry bark, 1–10 wt % of a moss and 30–96 wt % of a grain flour mixture as the remaining part.

5 Claims, 1 Drawing Sheet

NATURALLY DECOMPOSING DISPOSABLE TABLEWARE AND MANUFACTURING THEREOF

CROSS-REFERENCE TO RELATED APPLICATION

This application is a National Stage entry of International Application Number PCT/KR2004/001820, filed Jul. 22, 2004. The disclosure of the prior application is hereby incorporated herein in its entirety by reference.

TECHNICAL FIELD

The present invention relates, in general, to disposable tableware which is completely degradable under environmental conditions without environmental contamination, and a method of manufacturing the same. More particularly, the present invention relates to disposable tableware that does not contain any synthetic additive and thus is completely degradable in the natural environment and is suitable for compost, and a method of manufacturing such disposable tableware.

BACKGROUND ART

As human life and culture become diverse and complicated with industrial development, various types of disposable tableware have been produced to save time, including spoons, cups, dishes, lunch baskets and other disposable living necessities.

Currently used disposable tableware is mostly made using synthetic resins (e.g., polystyrene), pulp, and the like.

However, disposable products manufactured using synthetic resins contain ingredients harmful to humans. Also, they are major causes of environmental contamination due to problems associated with waste disposal by their increased use, and thus have a limitation in use.

In addition, paper products manufactured using pulp have the following problems: they are not economical because most raw materials including pulp are imported; forests have been damaged in the production of the raw material, pulp, resulting in environmental disruption; and pulps are treated with synthetic additives during processing, thus causing environmental contamination. These problems may be partially solved by recycling used pulp. However, enormous energy is required for the recycling of pulp, and various additives are used in a recycling process, thereby bringing about secondary environmental contamination. Also, pulp is typically waterproof-coated with vinyl to solve its structural problems. However, these coated products have been also restricted in use by various environmental regulations because they cause environmental contamination.

Thus, in restaurants and other places, this disposable tableware is inconvenient to use because they should be recovered separately from other general wastes after being used.

This restriction in the use of disposable tableware is because most conventional disposable tableware is not environmentally degraded and thus cause contamination of the soil when buried under the ground or produce environmental contaminants such as dioxin when burned.

To solve these problems, efforts were made to develop environmentally degradable disposable tableware. However, the resulting tableware is problematic in terms of requiring high production cost and not being practical.

Environmentally degradable disposable tableware will be described in detail, as follows.

In recent studies, attempts were made to replace polystyrene with natural polymeric materials obtained from starch from grains or wheat flour, crop residues, and the like.

Grain flours may be used as described in Korean Pat. Publication No. 96-0006565 which discloses a method comprising mixing and kneading wheat flour, starch, baking powder and salts, molding the resulting dough, and freezing and coating the molded dough, or in Korean Pat. Laid-open Publication No. 99-0047173 which discloses a method comprising mixing and kneading main materials, starch of grains and wheat flour, with auxiliary materials including sugars, aromatics and yeasts in purified water at a proper temperature, maturating the resulting dough, extruding the maturated dough, and molding, freezing and drying the extruded dough. In addition, the grain crop residues may be used according to a method as described in Korean Pat. Application No. 99-0055567, which comprises mixing pulverized hulls from rice, barley, German millet, Indian millet, and the like, starch and water, and molding and coating the resulting dough, or another method as described in Korean Pat. Application No. 99-0037967, which comprises mixing vegetable particles used as a major material, prepared by pulverizing corn stalks or various seed coats, with an edible glue, and compressing the mixture with a molding agent.

However, the resulting products have limited applications because they are heavy, easily destroyed, and contracted by outdoor temperature.

To solve these problems, natural polymers have been used as main materials inevitably in combination with non-degradable additives. Thus, the resulting products are also problematic with regard to degradation and production cost, thus making their practical use difficult.

DISCLOSURE OF THE INVENTION

Accordingly, the present invention has been made keeping in mind the above problems occurring in the prior art, and an object of the present invention is to provide disposable tableware with no risk of environmental contamination, which is prepared using environmentally friendly, completely degradable materials without additional chemical additives while maintaining the shape and function of general disposable tableware so that it is completely degraded under environmental conditions, thus not causing environmental contamination and problems associated with waste disposal such as separation from other wastes, and a method of manufacturing such disposable tableware.

BEST MODE FOR CARRYING OUT THE INVENTION

The above and other objects, features and other advantages of the present invention will be more clearly understood from the following detailed description taken in conjunction with the accompanying drawings.

Figure 1:
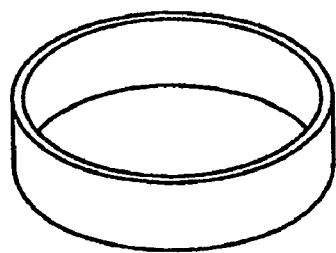
FIGS. 1 to 3 show disposable tableware molded according to embodiments of the present invention.
Figure 2:
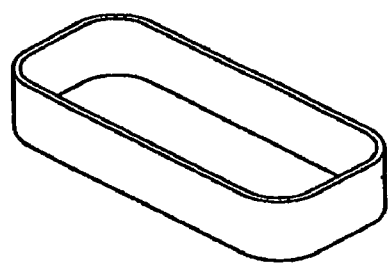
Figure 3:
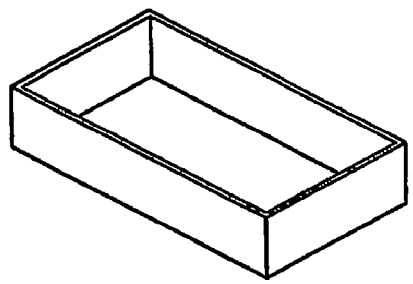

FIGS. 1 to 3 show disposable tableware molded according to embodiments of the present invention. Disposable tableware with no risk of environmental contamination according to the present invention is manufactured by using a composition including only substances completely degradable under environmental conditions. Disposable tableware prepared using this composition is completely degraded under natural environmental conditions and is suitable for compost.

The raw material composition of the disposable tableware according to the present invention comprises crop residues, including straws of grain crops (e.g., rice, wheat and barley) and grain hulls such as chaff (including bran), corn flour (starch such as corn starch), paper mulberry bark (a raw material of Korean traditional paper), a moss, and a grain flour mixture (a mixture of rice flour, barley flour (wheat flour), potato starch, glutinous rice flour and food powder).

Disposable tableware is manufactured by mixing the above separately pulverized components in a proper ratio and compression-molding the mixture in a metal mold at high temperature under high pressure using a press.

The composition used for manufacturing the disposable tableware of the present invention comprises 1–30 wt % of crop residues, including straws of grain crops (e.g., rice, wheat and barley) and grain hulls such as chaff (including bran), 1–30 wt % of corn flour (starch such as corn starch), 1–10 wt % of paper mulberry bark (a raw material of Korean traditional paper), 1–10 wt % of a moss, and 30–96 wt % of a grain flour mixture. The grain flour mixture includes 10–15 wt % of barley flour (wheat flour), 1–20 wt % of potato starch, 5–13 wt % of glutinous rice flour, 5–12 wt % of rice flour and 60 wt % or higher of food powder as the remaining part.

The components and their contents in the composition are determined based on the following factors.

The crop residues, including straws of grain crops (e.g., rice, wheat and barley) and grain hulls such as chaff (including bran), function to bind together components of disposable tableware to provide a desired frame (shape). If the content of the crop residues is lower than 1 wt %, disposable tableware has a low binding strength so that it is difficult to maintain a desired shape. If the content of the crop residues is higher than 30 wt %, disposable tableware is difficult to be molded in a desired shape.

The corn flour serves as a binder to increase the binding strength of other components except for the corn flour. That is, the corn flour prevents tableware from being distorted and becoming misshaped, thereby maintaining binding strength and shape of other components. If the content of the corn flour is lower than 1 wt %, disposable tableware has a low binding strength. If the content of the corn flour exceeds 30 wt %, tableware is very firm but is easily cracked.

The paper mulberry bark is used to increase the flexibility of tableware and make the tableware durable. If the content of the paper mulberry bark is lower than 1 wt %, tableware is inflexibility. In contrast, the use of the paper mulberry bark in an amount of higher than 10 wt % results in an undesired durability and firmness.

The moss is used to improve the antibacterial function of tableware. If the moss is used in an amount of lower than 1 wt %, the tableware has a reduced bactericidal activity. If the content of the moss exceeds 10 wt %, the tableware has a low binding strength.

Moss has been used for a very long period of time due to its high bactericidal activity. For example, according to a medical bible of Chinese Herbs and greatly advanced Chinese herbal medicine, called "Ben Cao Gang Mu", which was created by the greatest Chinese herbal doctor Li Shi Zhe during the Ming Dynasty of China, moss has the effects of relieving malaria, dyspepsia and bronchitis with fever and counteracting poison. In addition, a number of information about the antimicrobial activity of moss is available on the Internet.

The flexibility and firmness of the disposable tableware of the present invention are determined according to the ratio of the paper mulberry bark to the corn flour.

The grain flour mixture comprises the remaining part of the composition of the present invention, which is composed of rice flour, barley flour, potato starch, and glutinous rice flour and food powder. The grain flour mixture is used for airtightness and waterproofing, and its ingredients are used in a mixed form.

The rice flour has waterproofing, airtightness and coating functions.

The barley flour acts to weaken the high firmness of the potato starch.

The potato starch serves to reinforce binding strength and structural strength of tableware.

The glutinous rice flour functions to reinforce the coating to improve water- and moisture-proofing functions.

The food powder, which accounts for most of the grain flour mixture, has waterproofing, tightness and coating functions.

In addition, the barley flour content is determined based on the following factors. If the barley flour content is lower than 10 wt %, the firmness of the potato starch is increased. If the barley flour content exceeds 15 wt %, the firmness of the potato starch is reduced.

The potato starch content is determined based on the following factors. If the potato starch content is lower than 1 wt %, tableware has a low firmness. If the potato starch content exceeds 20 wt %, tableware has a high firmness.

The content of the glutinous rice flour is determined based on the following factors. If the glutinous rice flour is used in an amount of lower than 5 wt %, tableware has problems in coating, waterproofing and moisture-proofing capacity. If the glutinous rice flour is used an amount of higher than 13 wt %, it reacts with the starch, resulting in increased firmness of tableware, leading to formation of cracks in the tableware.

The rice flour content is determined by the following factors. If the rice flour content is lower than 5 wt %, tableware has problems in coating, waterproofing and moisture-proofing capacity. If the rice flour is used an amount of higher than 12 wt %, it reacts with the starch, resulting in increased firmness of tableware, leading to formation of cracks in the tableware.

The content of the food powder comprising the remaining part of the grain flour mixture is the highest in the composition. The food powder should account for at least 60% of the composition to maintain the waterproofing, airtightness and coating functions of other components.

Hereinafter, a method of manufacturing disposable tableware by compression molding using a press will be described in detail.

The disposable tableware is manufactured by determining the suitable amount of the components of the composition within ranges of 1–30 wt % for the crop residues, including straws of grain crops (e.g., rice, wheat and barley) and grain hulls such as chaff (including bran), 1–30 wt % for the corn flour (starch such as corn starch), 1–10 wt % for the paper mulberry bark (a raw material of Korean traditional paper), 1–10 wt % for the moss, and 30–96 wt % for the grain flour mixture (particularly, 10–15 wt % for the barley flour, 1–20 wt % for the potato starch, 5–13 wt % for the glutinous rice flour, 5–12 wt % for the rice flour and 60 wt % or higher for the food powder); finely pulverizing each of the components; mixing the pulverized components; and compression-molding the resulting mixture using a press to provide disposable tableware. This process for manufacturing disposable tableware will be described in more detail, as follows.

The components are supplied to a blender from a main material hopper, mixed in the blender and supplied as a feeder to a metal mold preheated to 140–150° C. and connected to a 500-ton hydraulic press.

Several molded products may be simultaneously generated according to the intended use.

Each of the components is supplied to the main material hopper using a main material supplier (cartridge).

The range of the molding temperature is determined by the following factors. If the temperature is lower than the range, the components are not molded. If the temperature is higher than the range, molded products are baked.

The compression molding under the above press is carried out for about one minute.

When the mixture of the finely pulverized components is pressed in the metal mold at 140–150° C. using a 500-ton press, it is molded into disposable tableware having open upper parts.

The disposable tableware is removed from the metal mold and transferred to a conveyor by a take-out robot.

Then, disposable tableware under transport on the conveyor are raised up and transferred to a pallet by a lifter. Molding defects (bugs) are then removed using a sandpaper of a trimming unit.

The trimmed tableware is finished with air in an air blowing unit, and dust is removed from the tableware.

The resulting tableware is subjected to a sterilization process.

The sterilized tableware is lifted, unloaded and packaged for sale.

A better understanding of the present invention may be obtained through the following example which is set forth to illustrate, but is not to be construed as the limit of the present invention.

EXAMPLE

From one metal mold, 81 paper coffee cups of the conventional size are produced at once, and in case of relatively large tableware such as Styrofoam instant noodle cups, 12 to 16 products are obtained at once. Thus, one hundred million of coffee cups and thirty million of instant noodle cups are produced every year.

The property of tableware is determined according to the ratio of raw materials. 30 wt % of bran, 30 wt % of corn flour, 5 wt % of paper mulberry bark, 5 wt % of a moss, and 30 wt % of the grain flour mixture (15 wt % of barley flour, 15 wt % of potato starch, 5 wt % of glutinous rice flour, 5 wt % of rice flour and 60 wt % of food powder), based on the total weight of the composition, 100 kg, were supplied from a material hopper to a blender, mixed in the blender and supplied as a feeder to a metal mold preheated to 140° C. Then, the mixture was compression-molded using a 500-ton hydraulic press for one minute to produce disposable tableware. The disposable tableware was very firm, had the color of bran, and was completely degraded within three to four months under environmental (outdoor) conditions. When the content of the grain flour mixture (powder) was increased, resulting tableware was firmer and durable and useable as a water container for a long period of time, and required one year or longer for complete degradation under environmental conditions.

When the content of the paper mulberry bark was increased, the resulting tableware had reduced firmness, but was flexible and maintained a desired breakage resistance so that the tableware was not easily broken.

Thus, if this tableware is used indoors without exposure to outdoor conditions and is preserved in a moisture-free state after being used, this tableware is believed to be multi-purpose green tableware that can be used semi-permanently.

The tableware was not damaged even when falling from the average height of desks for standing work, 1 m 50 cm. Also, the tableware is not harmful to humans because its main components are derived from materials directly associated with foods.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described hereinbefore, the present invention has advantages in that the straws and corn flour have binding ability, elasticity and solubility, which are responsible for maintaining the shape of tableware, and thus have high affinity to starch used as another raw material in tableware preparation and serve to increase the binding strength of the starch. The advantages of the present invention further include that the paper mulberry bark offers tableware elasticity to allow the tableware not to be broken by a certain degree of impact, and that the moss improves the freshness of the contents of the tableware due to its antibacterial activity. The advantages yet further include that tableware is waterproof due to the grain flour mixture without requiring additional waterproofing coating.

When buried under the ground, disposable tableware according to the present invention is completely degraded by water or moisture with the passage of time. Such degradation products can be used as compost. Also, the disposable tableware of the present invention is advantageous in terms of being capable of being used as livestock feed even when they are discarded along with food waste without separation in restaurants. Further, when discarded in mountains or resorts, the present disposable tableware is dissolved and buried under the ground with the passage of time while not harming nature and the environment. Therefore, the present invention is useful in related industrial fields.

The invention claimed is:

1. Disposable tableware completely degradable under environmental conditions without environmental contamination, which is prepared by finely pulverizing and mixing 1–30 wt % of crop residues, 1–30 wt % of corn flour, 1–10 wt % of paper mulberry bark, 1–10 wt % of a moss and 30–96 wt % of a grain flour mixture, and compression-molding a resulting mixture to a predetermined shape and size at high temperature under high pressure.

2. The disposable tableware completely degradable under environmental conditions without environmental contamination according to claim 1, wherein the crop residues are selected from straws of rice, wheat, barley and other grain crops, chaff, bran, and mixtures thereof.

3. The disposable tableware completely degradable under environmental conditions without environmental contamination according to claim 1, wherein the grain flour mixture comprises 10–15 wt % of barley flour, 1–20 wt % of potato starch, 5–13 wt % of glutinous rice flour, 5–12 wt % of rice flour and 60 wt % or higher of food powder as the remaining part.

4. A method of manufacturing disposable tableware completely degradable under environmental conditions without environmental contamination using plants and crops as main materials, comprising:

determining a composition for preparing the disposable tableware, which includes 1–30 wt % of crop residues, 1–30 wt % of corn flour, 1–10 wt % of paper mulberry bark, 1–10 wt % of a moss, and, as a remaining part, a grain flour mixture wherein, the grain flour mixture includes 10–15 wt % of barley flour, 1–20 wt % of potato starch, 5–13 wt % of glutinous rice flour, 5–12 wt % of rice flour and, as a remaining part, 60 wt % or higher of food powder, finely pulverizing each component, and mixing pulverized components; and compression-molding a resulting mixture in a metal mold preheated to 140–150° C. and connected to a 500-ton hydraulic press to provide disposable tableware.

5. The method of manufacturing disposable tableware completely degradable under environmental conditions without environmental contamination according to claim 4, wherein the crop residues are selected from straws of rice, wheat, barley and other grain crops, chaff, bran, and mixtures thereof.

* * * * *